United States Patent
Aoki et al.

(10) Patent No.: US 6,825,910 B2
(45) Date of Patent: Nov. 30, 2004

(54) SEALING METHOD OF LIQUID CRYSTAL DISPLAY PANEL AND SEALING APPARATUS FOR LIQUID CRYSTAL DISPLAY PANEL

(75) Inventors: Eiichirou Aoki, Tokyo (JP); Tsutomu Uemura, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/983,695

(22) Filed: Oct. 25, 2001

(65) Prior Publication Data

US 2002/0054271 A1 May 9, 2002

(30) Foreign Application Priority Data

Oct. 30, 2000 (JP) ........................................ 2000-329848

(51) Int. Cl.[7] .......................... G02F 1/1339; H01J 9/26; H01J 9/32
(52) U.S. Cl. ...................... 349/190; 349/153; 349/154; 445/25
(58) Field of Search ................................ 349/153, 154, 349/190; 445/25

(56) References Cited

U.S. PATENT DOCUMENTS

| | | | | |
|---|---|---|---|---|
| 5,448,014 A | * | 9/1995 | Kong et al. ................ | 174/52.3 |
| 5,798,813 A | * | 8/1998 | Ohashi et al. .............. | 349/154 |
| 5,862,839 A | * | 1/1999 | Nakamura et al. ............. | 141/7 |
| 5,898,041 A | | 4/1999 | Yamada et al. | |
| 6,001,203 A | | 12/1999 | Yamada et al. | |
| 6,118,509 A | | 9/2000 | Miyake | |
| 6,246,253 B1 | * | 6/2001 | Kang et al. ................. | 324/770 |

FOREIGN PATENT DOCUMENTS

| | | | | |
|---|---|---|---|---|
| JP | 06110065 | * | 4/1994 | ......... G02F/1/1341 |
| JP | 08101373 | * | 4/1996 | ......... G02F/1/1333 |
| JP | 08313854 | * | 11/1996 | ............. G02F/1/13 |
| JP | 08-313854 | * | 11/1996 | ............. G02F/1/13 |
| JP | 09274191 | * | 10/1997 | ......... G02F/1/1341 |
| JP | 10-062792 | * | 3/1998 | ......... G02F/1/1341 |
| JP | 2 882 376 | | 2/1999 | |
| JP | 2001-235759 | * | 8/2001 | ......... G02F/1/1341 |
| KR | 1997-138 A | | 3/1995 | |
| KR | 2000-61638 A | | 10/2000 | |

* cited by examiner

Primary Examiner—Robert H. Kim
Assistant Examiner—Jeanne Andrea Di Grazio
(74) Attorney, Agent, or Firm—Sughrue Mion, PLLC

(57) ABSTRACT

First, a plurality of liquid crystal display panels having filling ports for filling liquid crystal are arranged. Next, a ultraviolet ray curing sealing agent in a wet state is transferred to each of the filling ports by a transfer roller in a lump. Then, an ultraviolet ray is irradiated to the ultraviolet ray curing sealing agent.

28 Claims, 17 Drawing Sheets

SEALING METHOD OF LIQUID CRYSTAL DISPLAY PANEL AND SEALING APPARATUS FOR LIQUID CRYSTAL DISPLAY PANEL

BACKGROUND OF THE INVENTION

1. Field of the Invention

The present invention relates to a sealing method of a liquid crystal display panel and a sealing apparatus for a liquid crystal display panel, particularly to a sealing method and a sealing apparatus appropriate for sealing a filling port regarding a small size liquid crystal display panel with the liquid crystal has been filled.

2. Description of the Related Art

In a conventional sealing method of a liquid crystal display panel 1, as shown in FIG. 1, a pair of substrates 2 opposing to each other are first joined by a sealing agent with a predetermined distance. Next, the liquid crystal is filled from a filling port 4 into a gap 3. Then, the filling port 4 is sealed by an ultraviolet ray curing sealing agent (an adhesive agent) 6. And then, a mask 8 where an opening that matches to the filling port 4 is formed covers the ultraviolet ray curing sealing agent 6, an ultraviolet ray 9 is irradiated in this state to cure the ultraviolet ray curing sealing agent 6 only at the filling port 4, and thus a cured area 6a is obtained. In a region where the ultraviolet ray 9 is blocked by the mask 8, the ultraviolet ray curing sealing agent 6 is an uncured area 6b. Thereafter, the uncured area 6b is removed by an organic solvent. Such a method is described in Japanese Patent No. 2882376.

Alternatively, a method has been developed in which a plurality of the liquid crystal display panels 1 are adhered and arranged in a block state and the ultraviolet ray curing sealing agent is coated on the block body utilizing a dispenser having a coating orifice of a long hole state.

These sealing methods are appropriate for sealing the hole of the liquid crystal display panel 1 of a current normal size. However, coating of ultraviolet ray curing sealing agent and curing processing by the ultraviolet ray irradiation are not feasible regarding a smaller size liquid crystal display panel, and a quality reduces.

Specifically, in a sealing process in the small size liquid crystal display panel, the number of the panel in a batch treatment is more than that of the current size liquid crystal display panel. For example, although 40 to 80 pieces are processed as one batch in the current size, 280 to 480 pieces are processed as one batch in the small size. Since processing time per one batch is longer accordingly, the time difference of the coating of the ultraviolet ray curing sealing agent at the first and the last part of the processing is larger than that of the current case of the liquid crystal display panel. As a result, this threatens to reduce a quality and a yield.

This is because the time difference of the processing for the liquid crystal display panel in the initial coating period and the liquid crystal display panel in the last coating period becomes large when the ultraviolet ray curing sealing agent is coated on the filling port by the dispenser method of the prior art, and the time difference threatens to occur mixing and the like of the ultraviolet ray curing sealing agent into a display plane of the liquid crystal display panel in which the liquid crystal is filled. As described, in the liquid crystal display panels processed in one batch, prevention of the ultraviolet ray curing sealing agent into the display plane is difficult and a quality reduction may occur, and thus improvement of the yield may be difficult. Accordingly, in a sealing technology of the small size liquid crystal display panel, the technology development that reduces the coating time difference of the ultraviolet ray curing sealing agent is desired.

Further, when coating of the ultraviolet ray curing sealing agent is executed utilizing the conventional dispenser, the ultraviolet ray curing sealing agent drops on the display plane of the liquid crystal display panel. Accordingly, the quality threatens to reduce and the yield may not improve. This is because management of a coating shape and a coating amount is difficult when the filling port is sealed by using the conventional dispenser. In other words, this is because the ultraviolet ray curing sealing agent may protrude from an end surface of the filling port to adhere to the display plane.

When the ultraviolet ray curing sealing agent adheres to the display plane, there are problems such that a polarizing plate cannot be adhered, and the panel cannot be directly used as the liquid crystal display panel. Thus, an operation is required such that an unnecessary portion is scraped off. At this point, the liquid crystal display panel may be scratched, which causes a defective. Therefore, the development of the technology is desired in which the coating shape and the coating amount of the ultraviolet ray curing sealing agent can be easily managed in coating the ultraviolet ray curing sealing agent.

SUMMARY OF THE INVENTION

The object of the present invention is to provide a sealing method of a liquid crystal display panel and a sealing apparatus for a liquid crystal display panel that reduce the coating time difference of the ultraviolet ray curing sealing agent and that can easily manage the coating shape and the coating amount of the ultraviolet ray curing sealing agent particularly when the filling port of the small size liquid crystal display panel is sealed.

According to one aspect of the present invention, a sealing method of a liquid crystal display panel comprises the steps of: arranging a plurality of liquid crystal display panels having filling ports to fill liquid crystal; transferring an ultraviolet ray curing sealing agent in a wet state to each of the filling ports by a transfer roller in a lump; and irradiating an ultraviolet ray to the ultraviolet ray curing sealing agent.

According to another aspect of the present invention, a sealing apparatus for a liquid crystal display panel comprises a cassette in which a plurality of liquid crystal display panels having filling ports to fill liquid crystal; and a transfer roller which transfers a ultraviolet ray curing sealing agent in a wet state to each of the filling ports in a lump.

According to the present inventions, when the liquid crystal is filled in the liquid crystal display panel and the hole is sealed, the liquid crystal is filled in the gap between a pair of substrates of the liquid crystal display panel from the filling port. And, a plurality of the liquid crystal display panels are arranged. And then, the ultraviolet ray curing sealing agent in a wet state is transferred on each filling port by a transfer roller in a lump. Thereafter, the ultraviolet ray is irradiated to cure the agent, and the filling ports are closed and sealed.

According to the present invention, complicateness of a manufacturing process is solved in comparison with the sealing of the filling port by the conventional dispenser method, the sealing process of the filling port is performed faster as a processing, and thus the small size liquid crystal display panel can be commercialized more inexpensively. In addition, a product with high reliability and high quality can be obtained because of good yield.

If opposing substrates of the liquid crystal display panel are pressed with each other by a pressurizing unit, for example, the gap of the liquid crystal display panel is controlled, and the positional accuracy and the coating amount of the ultraviolet ray curing sealing agent coated on the small size liquid crystal display panel can be stabilized.

If residual liquid crystal of the liquid crystal display panel is wiped in a lump by a wiping unit, for example, the positional accuracy and the coating amount of the ultraviolet ray curing sealing agent coated on the small size liquid crystal display panel can be stabilized.

If an ultraviolet ray to the ultraviolet ray curing sealing agent through a mask with an opening which matches to the filling port by a ultraviolet ray irradiation device, for example, only the ultraviolet ray curing sealing agent coated on the filling port can be cured, the accuracy of an irradiation position and the irradiation amount of the ultraviolet ray to the small size liquid crystal display panel can be stabilized.

If a coating state of the ultraviolet ray curing sealing agent to the filling ports and an sealing state by the ultraviolet ray irradiation are confirmed with a sensor, for example, the positional accuracy and the coating amount of the ultraviolet ray curing sealing agent coated on the small size liquid crystal display panel can be stabilized by recognizing a coated state in an image processing to detect the defective.

DESCRIPTION OF THE PREFERRED EMBODIMENTS

Figure 1:
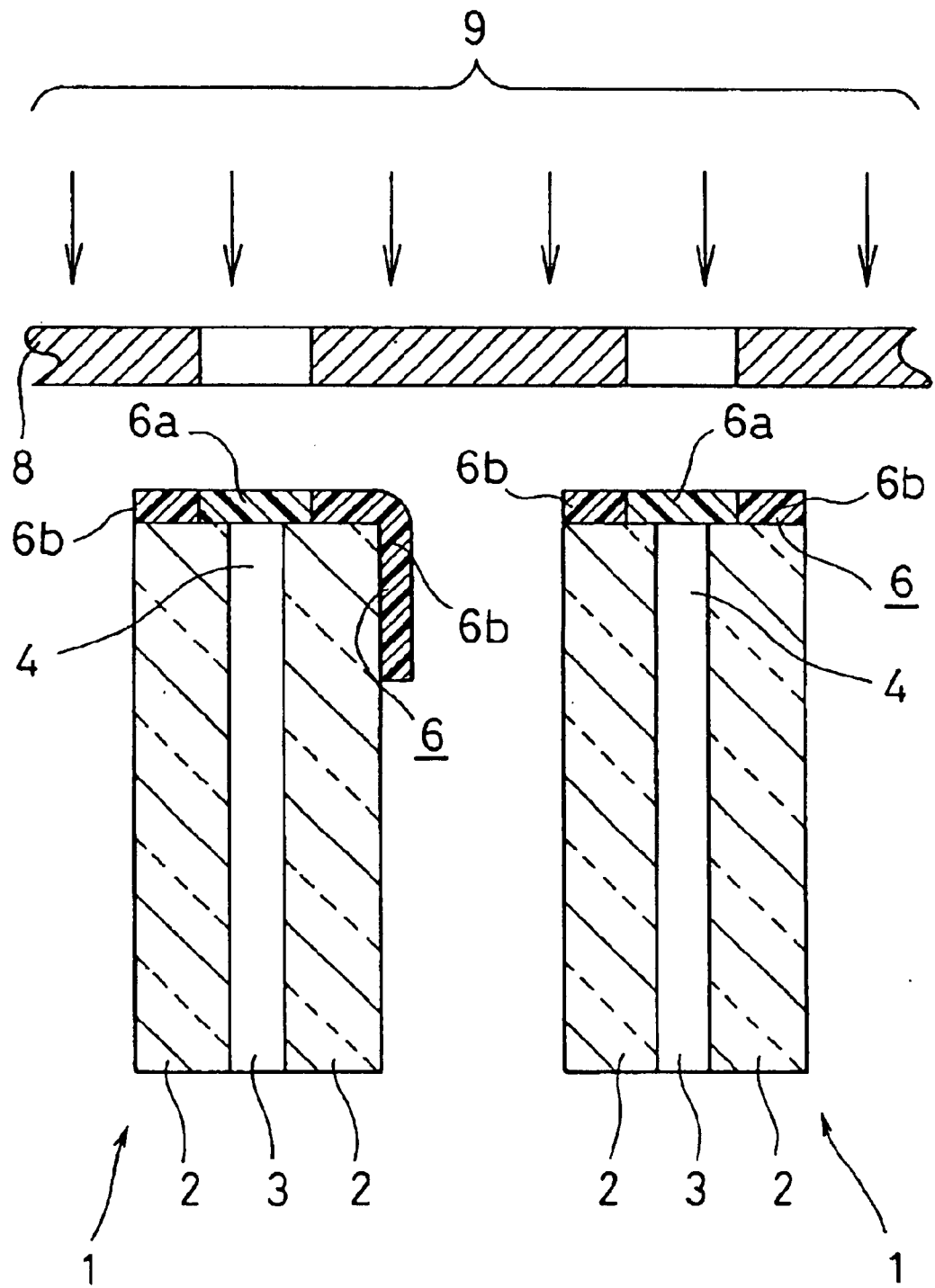
FIG. 1 is a schematic view showing a conventional sealing apparatus.
Figure 2A:
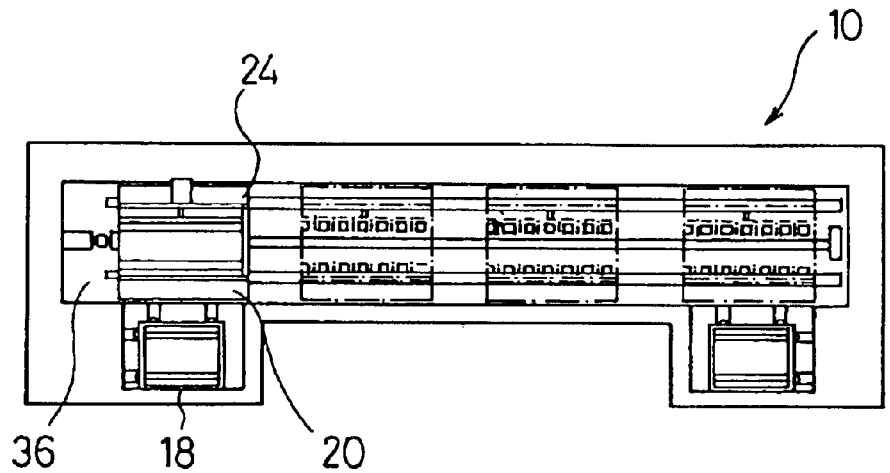
FIGS. 2A to 2C are views showing a sealing apparatus according to an embodiment of the present invention.
Figure 2B:
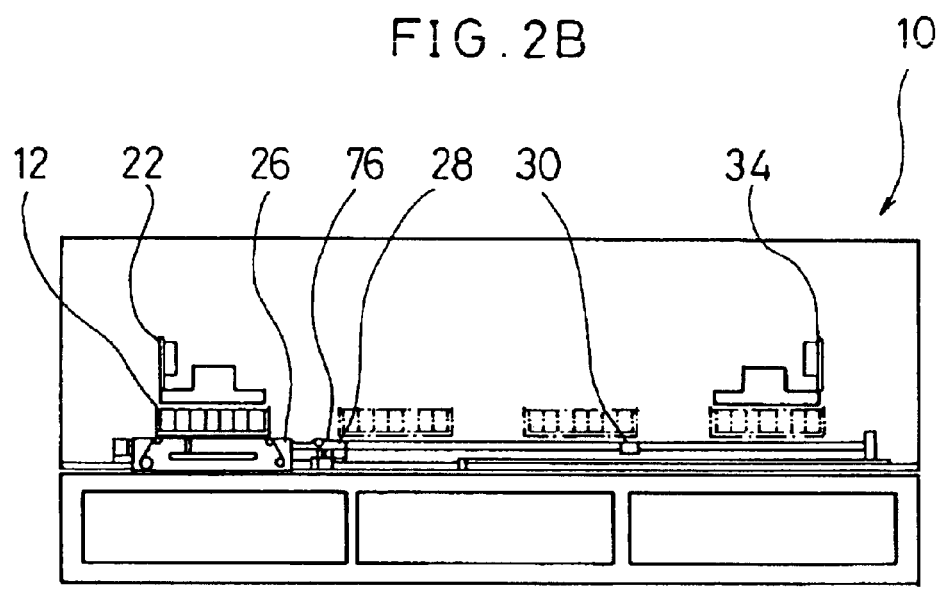
Figure 2C:
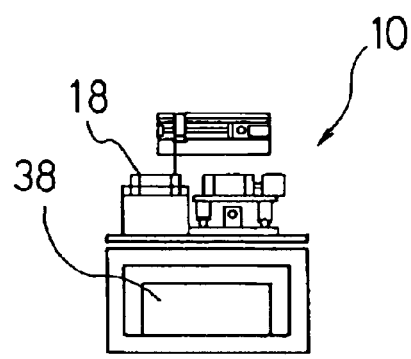

In the following, description will be made specifically for the preferred embodiments of the present invention with reference to the drawings. FIGS. 2A to 2C are views showing a sealing apparatus according to an embodiment of the present invention. FIG. 2A is a plan view, FIG. 2B is a front view, and FIG. 2C is a right side view.

A loader unit 22, which supplies a liquid crystal panel 12 stored in a cassette 18 of a previous process in a well-order manner to a predetermined position in a jig 20 at every sheet or every strap, is provided to a sealing apparatus 10 according to the present invention. Further, a pressurizing unit 24 for controlling a cell gap of a liquid crystal panel 12 supplied into the jig 20 is provided to the sealing apparatus 10. The cell gap is the distance between the two transparent substrate of the liquid crystal panel 12. A wiping unit 26, which wipes residual liquid crystal protruded with the gap control of the liquid crystal panel 12 by the pressurizing unit 24 pressurizing the liquid crystal panel 12, is provided to the sealing apparatus 10. A coating unit 28, which coats an ultraviolet ray curing sealing agent 16 to a predetermined position of a filling port 14 of the liquid crystal panel 12 by a predetermined amount, is provided to the sealing apparatus 10. A UV irradiation unit 30, which gives a predetermined ultraviolet ray amount to the liquid crystal panel 12 to cure the ultraviolet ray curing sealing agent 16 and to seal the filling port 14 of the liquid crystal panel 12, is provided to the sealing apparatus 10. An unloader unit 34, which stores the liquid crystal panel 12 in the jig 20 into a cassette 32 of the next process (refer to FIG. 11) at every sheet or every strap in a well-order manner, is provided to the sealing apparatus 10. A control unit 38, which controls a transport unit 36 transporting the jig 20 from the loader unit 22 to the unloader unit 34 and the entire sealing apparatus 10.

Figure 3:
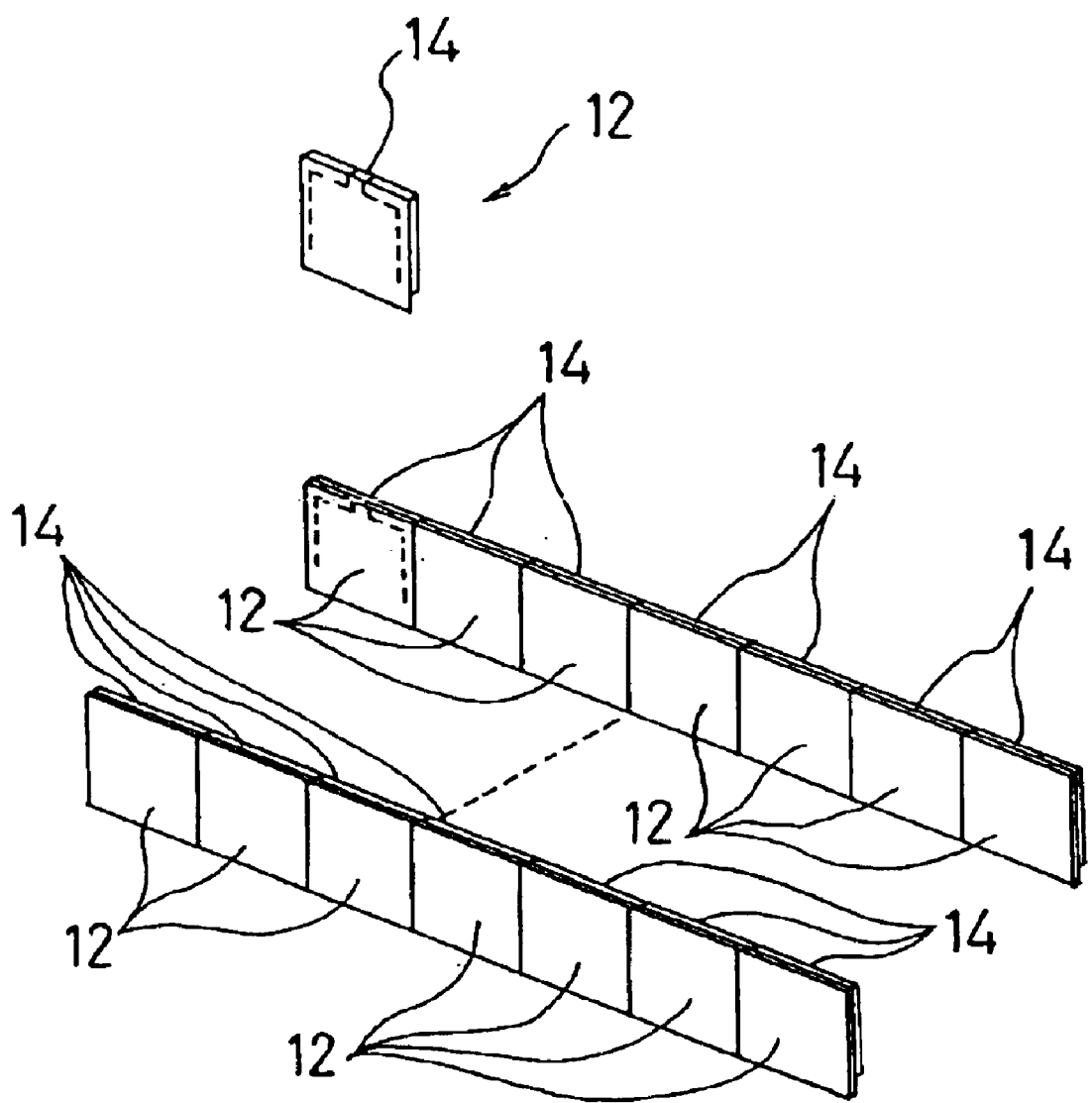
FIG. 3 is a perspective view showing a liquid crystal panel.

FIG. 3 is a perspective view showing the liquid crystal panel. The liquid crystal display panel 12 is a semi-product in which a pair of the opposing substrates are joined with a predetermined distance by a sealing material and the liquid crystal is filled in the gap from the filling port 14. A plurality of the liquid crystal panels 12 are arranged in a group, and supplied to the sealing apparatus 10 in stored state in the cassette 18 as the sheet or as the strap in a well-order manner.

Figure 4A:
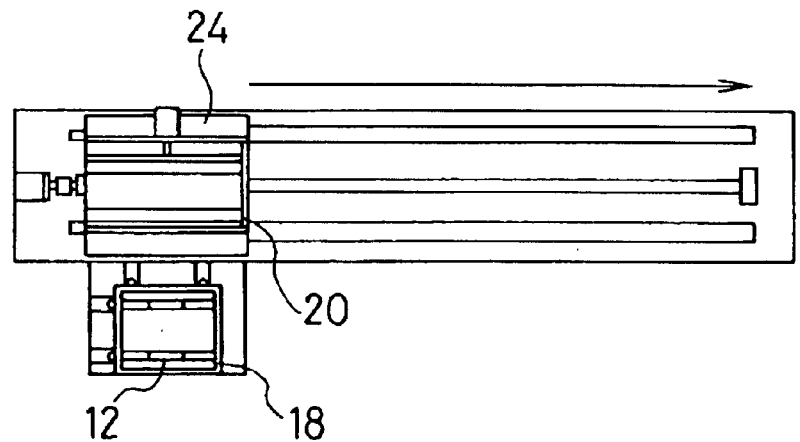
FIGS. 4A to 4C are views showing a loader unit 22.
Figure 4B:
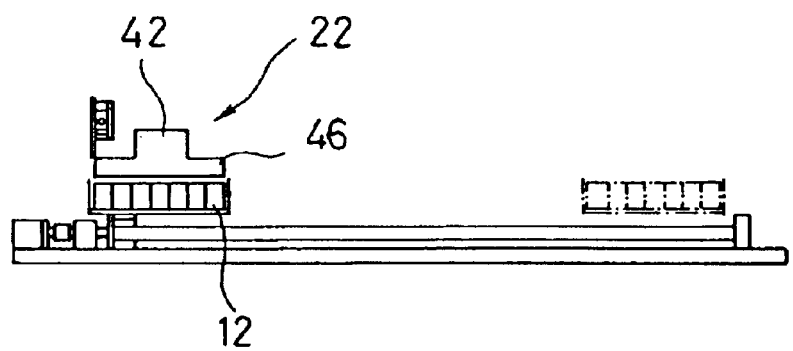
Figure 4C:
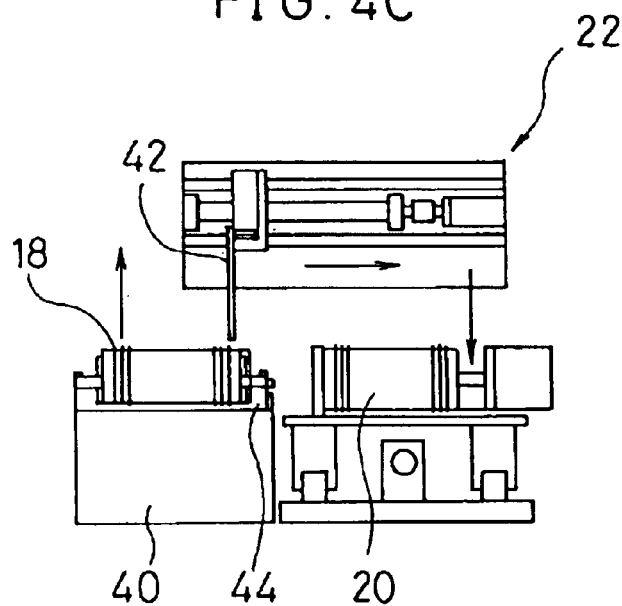

FIGS. 4A to 4C are views showing the loader unit 22. FIG. 4A is a plan view, FIG. 4B is a front view, and FIG. 4C is a right side view. A loader cassette table 40 that holds the cassette 18 supplied in the previous process and a supply handler 42 that supplies the liquid crystal panel 12 in the cassette 18 to the jig 20 at every sheet or every strap are provided to the loader unit 22. The liquid crystal panels 12 are stored in a well-order manner in the cassette 18 of the previous process in the sheet state or the strap state. Spacers made of resin exist alternately in the jig between the liquid crystal panels 12. The loader cassette table 40 is the one that can hold the cassette 18 by an air pressure actuator 44 and that can confirm the directivity of the cassette 18. Furthermore, the supply handler 42 includes a vacuum chuck pad 46 and is designed to hold the liquid crystal panel 12 to move and mount it from the cassette 18 to a predetermined position of the jig 20.

Figure 5A:
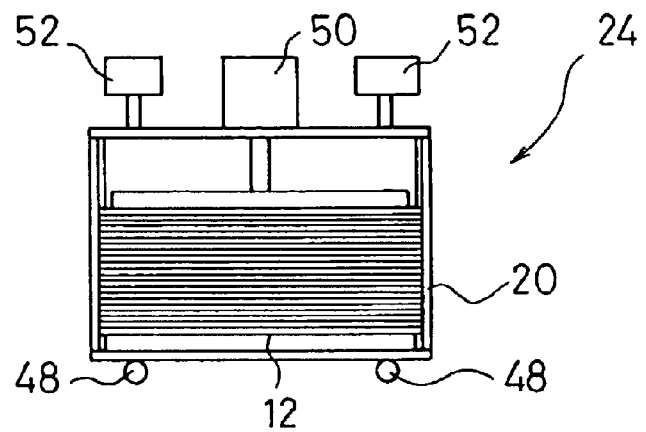
FIGS. 5A to 5D are views showing a pressurizing unit 24.
Figure 5B:
Figure 5C:
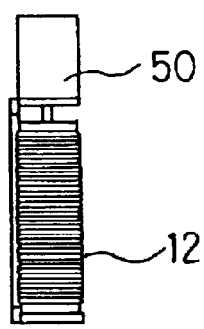
Figure 5D:
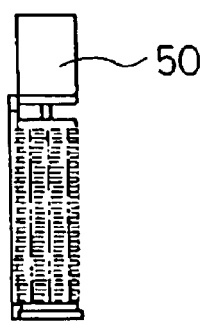

FIGS. 5A to 5D are views showing the pressurizing unit 24. FIG. 5A is a plan view, FIG. 5B is a front view, FIG. 5C is a left side view, and FIG. 5D is a left side view showing a state before pressurization. The pressurizing unit 24 is the unit to control the cell gap of the liquid crystal panel 12 supplied into the jig 20. A fixing clamp 48, which is provided on the transport unit 36 to fix the jig 20, and a pressurizing actuator 50, which presses (pressurizes) the liquid crystal panel 12, are provided to the pressurizing unit 24. The pressurizing actuator 50 is constituted of an air pressure actuator, for example. The fixed clamp 48 is designed such that an air pressure actuator 52 can hold the jig 20. The pressurizing actuator 50 is controlled by air pressure, and thrust of the actuator 50 can also be varied by arbitrary setting.

Figure 6A:
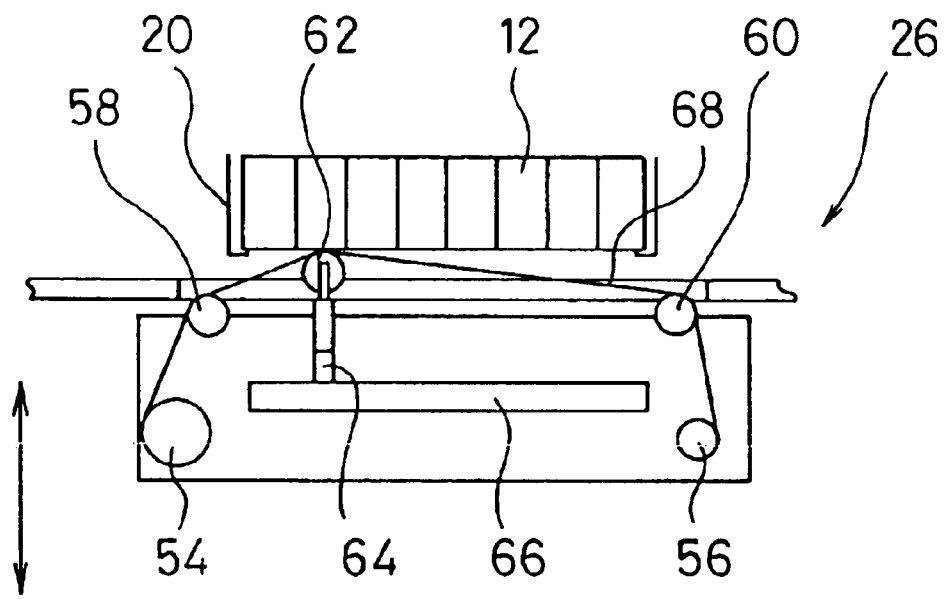
FIGS. 6A and 6B are front views showing a wiping unit 26.
Figure 6B:
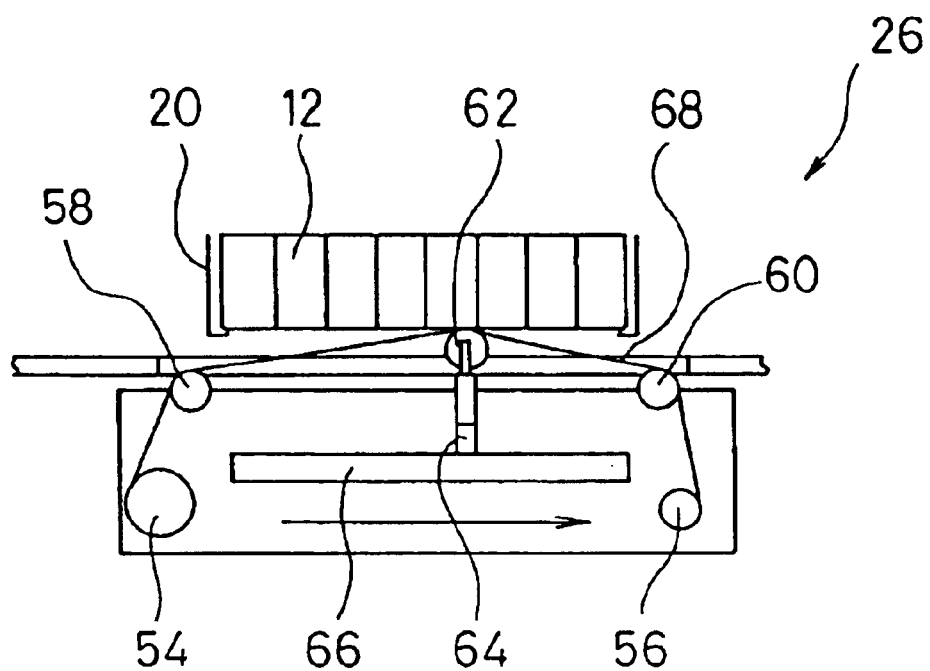
Figure 7:
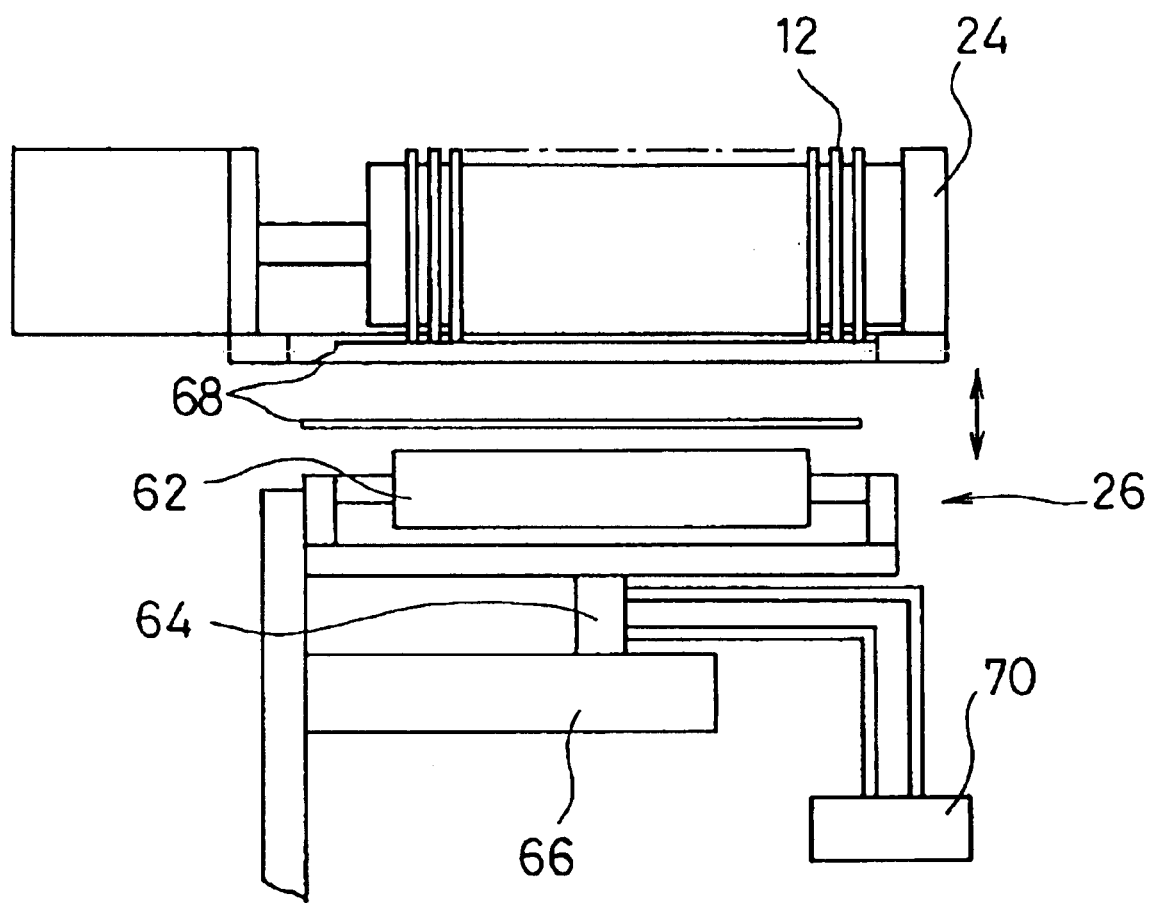
FIG. 7 is a left side view showing the wiping unit 26.

FIGS. 6A and 6B are front views showing the wiping unit 26. FIG. 6A shows the movement of a wiping roll 62 in vertical directions, and FIG. 6B shows the movement of the wiping roll 62 in horizontal directions. FIG. 7 is a left side view showing the wiping unit 26. A feeding roll 54 and a reeling roll 56, which are rotative, supported in a distance in the orthogonal direction to the movement direction of the jig 20 are provided to the wiping unit 26. Guiding rolls 58 and 60 are supported freely rotatively above the rolls 54 and 56. Furthermore, a wiping roll 62 is supported freely rotatively at the tip portion of an elevating rod 64, which can be freely elevated, at the middle position between the feeding roll 54 and the reeling roll 56 such that the wiping roll 62 is pressed to the periphery of the liquid crystal panel 12 with an appropriate pressure.

The elevating rod 64 is freely movably attached to a drive guiding mechanism 66 parallel with the moving direction of the jig 20. And, a wiping cloth 68 of a roll state is attached to the feeding roll 54. The wiping cloth 68 is pulled out from the feeding roll 54 and reeled by the reeling roll 56 via the guiding roll 58, the wiping roll 62 and the guiding roll 60. Furthermore, a pressure adjuster 70 is attached to the elevating rod 64, and the pressing force of the wiping roll 62 to the liquid crystal panel 12 is adjustable. A ratchet structure or the like is provided to the reeling roll 56 to prevent the unreeling roll 56 from rotating to the reeling direction.

Figure 8A:
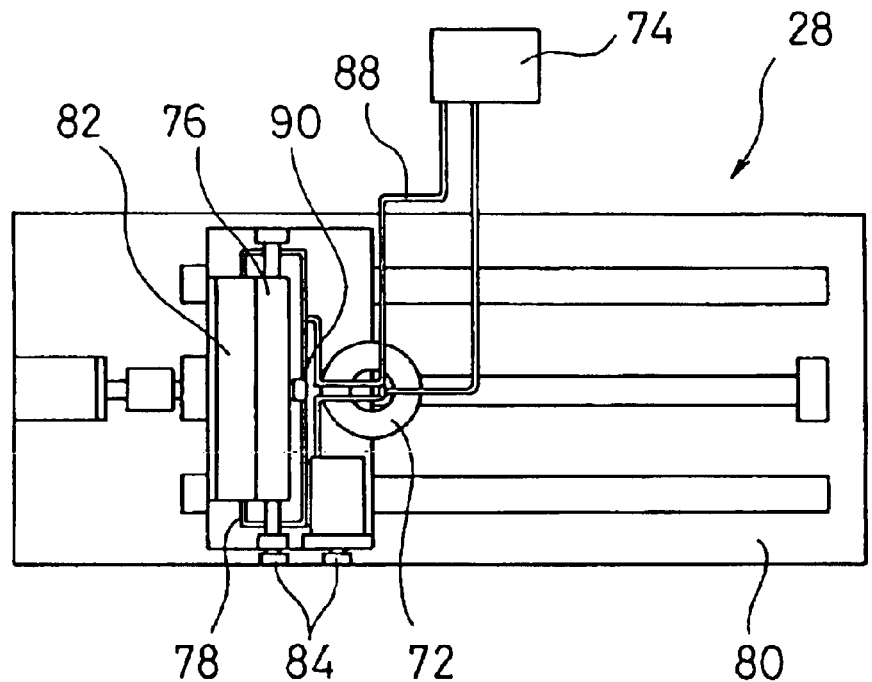
FIGS. 8A and 8B are views showing a coating unit 28.
Figure 8B:
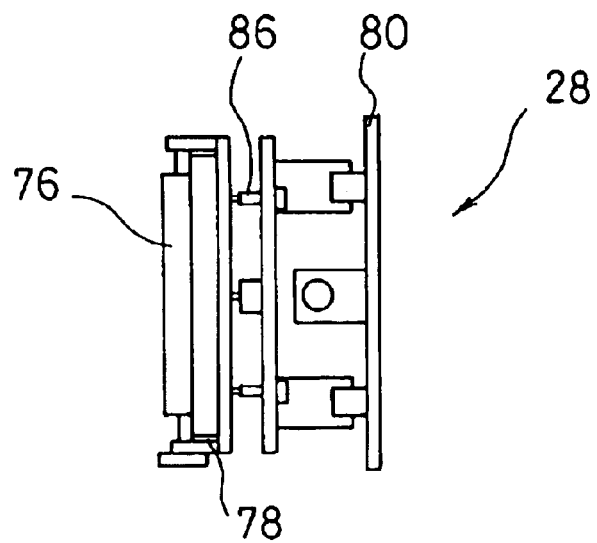
Figure 9:
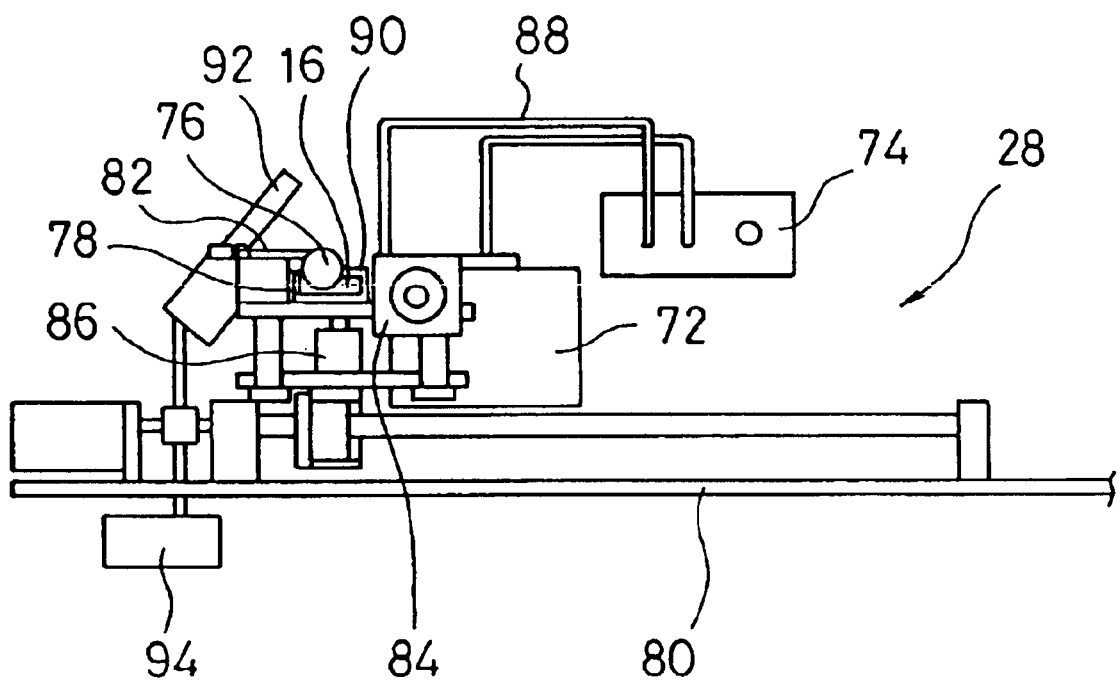
FIG. 9 is a front view showing the coating unit 28.

FIGS. 8A and 8B are views showing the coating unit 28. FIG. 8A is a plan view, and FIG. 8B is a right side view. FIG. 9 is a front view showing the coating unit 28. A sealing agent tank 72 in which the ultraviolet ray curing sealing agent 16 is filled is provided to the coating unit 28. A dispense controller 74, which ejects the ultraviolet ray curing sealing agent 16 from the sealing agent tank 72 by a constant amount, is provided to the coating unit 28. A sealing agent bath 78, which transfers the ultraviolet ray curing sealing agent 16 ejected from the dispense controller 74 onto a transfer roller 76, is provided to the coating unit 28. A transfer roller unit 80, which gives a film surface of the ultraviolet ray curing sealing agent 16 onto the transfer roller 76, is provided to the coating unit 28. A squeegee 82, which generates a constant film surface in generating the film surface on the transfer roller 76, is provided to the coating unit 28.

The transfer roller 76 of the transfer roller unit 80 is supported by a transfer roller rotation mechanism unit 84 and a transfer roller elevation mechanism unit 86. Further, the sealing agent tank 72 and the sealing bath 78 are connected by a hose and a tube 88, and thus the ultraviolet ray curing sealing agent 16 can be supplied at a constant amount always. The film surface of the ultraviolet ray curing sealing agent 16 in the sealing agent bath 78 is detected by a liquid surface detection sensor 90. And, the sensor is controlled by the dispense controller 74 so as to make the height of the film surface constant.

The coating unit 28 is under the environment of nitrogen atmosphere to prevent the liquid crystal panel 12 from being contaminated. The dispense controller 74 is equipped with a solenoid valve and a regulator (the both are not shown) in the inside thereof, and opening/closing of the solenoid valve and an injecting pressure of sealing agent are controlled by the control unit 38 of the sealing apparatus 10. The speed of the transfer roller rotation mechanism unit 84 to rotate the transfer roller 76, the height where the transfer roller elevation mechanism unit 86 makes the transfer roller 76 contact the film surface of the ultraviolet ray curing sealing agent 16 in the sealing agent bath 78, and the gap (the distance between the transfer roller and the filling port 14 of the liquid crystal panel 12) for transferring the agent to the liquid crystal panel 12 can be severally controlled. Parameters are set to the control by the control unit 38 of the sealing apparatus 10, and the control is thus executed.

The surface position of the ultraviolet ray curing sealing agent 16 on the transfer roller 76 is maintained at a constant position by the squeegee 82. The contact amount of the squeegee 82 with the transfer roller 76 is determined by a variable mechanism (not shown), and the parameters are set by the control unit 38 of the sealing apparatus 10, and the control is performed. The coating state (the coating state of the filling port 14) of the ultraviolet ray curing sealing agent 16 by the coating unit 28 is recognized by a CCD camera 92 and an image processor 94. If a coating defective of the ultraviolet ray curing sealing agent 16 occurs, the sealing apparatus 10 is designed to stop to call an alarm of the occurrence of the coating defective.

Figure 10A:
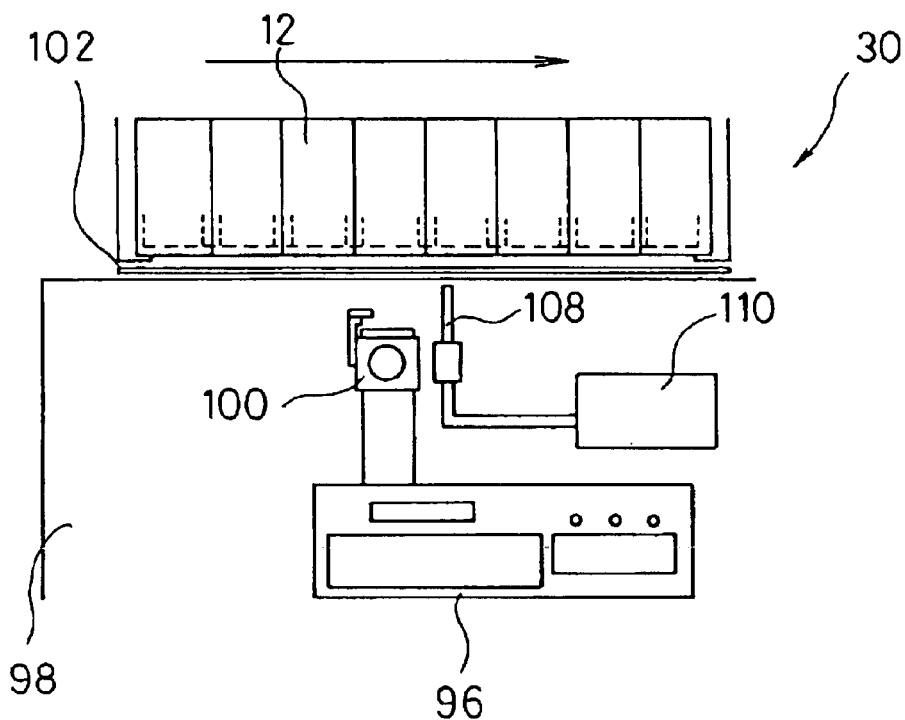
FIGS. 10A and 10B are views showing a UV irradiation unit 30.
Figure 10B:
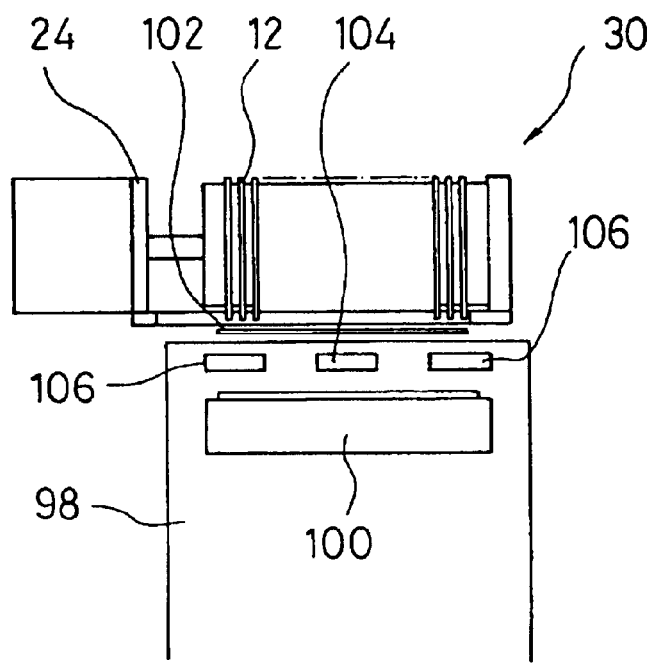

FIGS. 10A and 10B are views showing the UV irradiation unit 30. FIG. 10A is a front view, and FIG. 10B is a left side view. An ultraviolet ray irradiation device 96 is provided to the UV irradiation unit 30. In the ultraviolet ray irradiation device 96, an ultraviolet ray lamp 100 is installed in its case 98, where the ultraviolet ray lamp 100 irradiates the liquid crystal panel 12 in the jig 20 that positions above the lamp. A mask 102 is provided on the ceiling surface of the case 98, the mask fitting the size of the filling port 14 of the liquid crystal panel 12, and the mask controls the ultraviolet ray amount irradiated on the filling port 14 of the liquid crystal panel 12. Therefore, the ultraviolet ray can be irradiated on a spot, and thus the ultraviolet ray can be evenly irradiated on the liquid crystal panel 12 by every sheet or every strap array.

Further, at the position directly above the ultraviolet ray lamp 100 and opposing to the central portion of the ultraviolet ray lamp 100 in a longitudinal direction, an integrating light quantity meter for control 104, which measures the integrating light quantity of the ultraviolet ray emitted by the ultraviolet ray lamp 100 to control turning on/off of the ultraviolet ray lamp 100, is provided. Furthermore, at the position directly above the ultraviolet ray lamp 100 and opposing to the both end portions of the ultraviolet ray lamp 100 in the longitudinal direction, integrating light quantity meters for management 106, which measure and manage the integrating light quantity of the ultraviolet ray emitted by the ultraviolet ray lamp 100 to detect the reduction of the integrating light quantity, are provided. The curing state (the sealing state of the filling port 14) of the ultraviolet ray curing sealing agent 16 by the ultraviolet ray irradiation is recognized by a CCD camera 108 and an image processor 110. If a curing defective of the ultraviolet ray curing sealing agent 16 occurs, irradiation processing of the ultraviolet ray can be executed again.

Figure 11A:
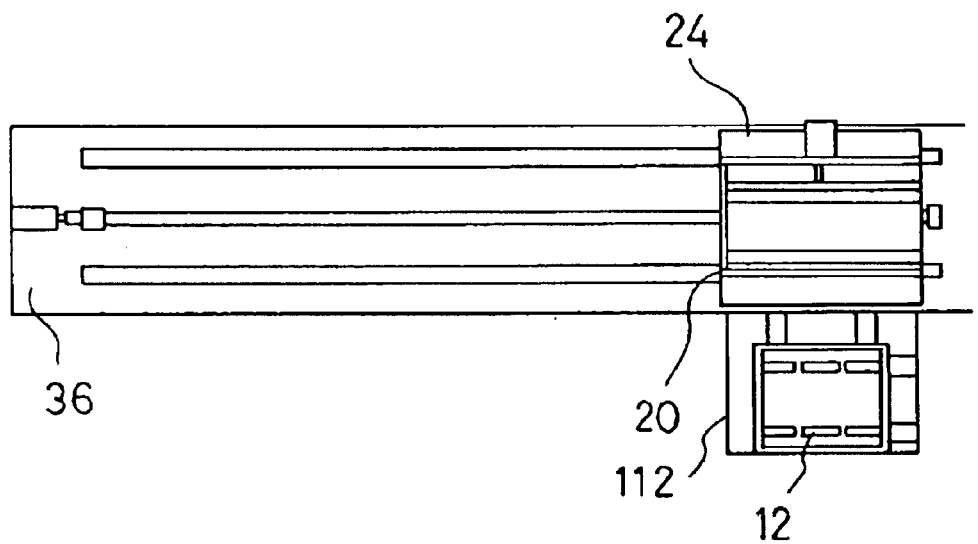
FIGS. 11A to 11C are views showing an unloader unit 34.
Figure 11B:
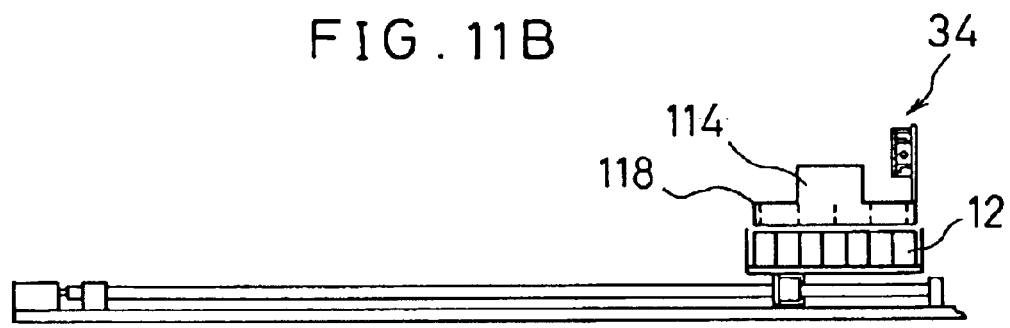
Figure 11C:
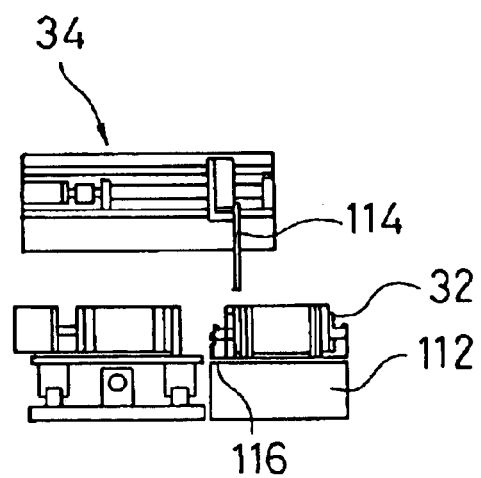

FIGS. 11A to 11C are views showing the unloader unit 34. FIG. 11A is a plan view, FIG. 11B is a front view, and FIG. 11C is a left side view. An unloader cassette table 112, which receives the supply of the cassette 32 of the next process to hold the cassette 32, and a storage handler 114, which stores the liquid crystal panel 12 in the jig 20 of the sealing apparatus 10 into the cassette 32 by every sheet or every strap, are provided to the unloader unit 34. The unloader cassette table 112 can hold the cassette 32 by an air pressure actuator 116, and can confirm the directivity of the cassette 32. In addition, a vacuum chuck pad 118 is provided to the storage handler 114, and the liquid crystal panel 12 can be held to move and mount on a predetermined position of the cassette 32 from the jig 20.

Figure 12A:
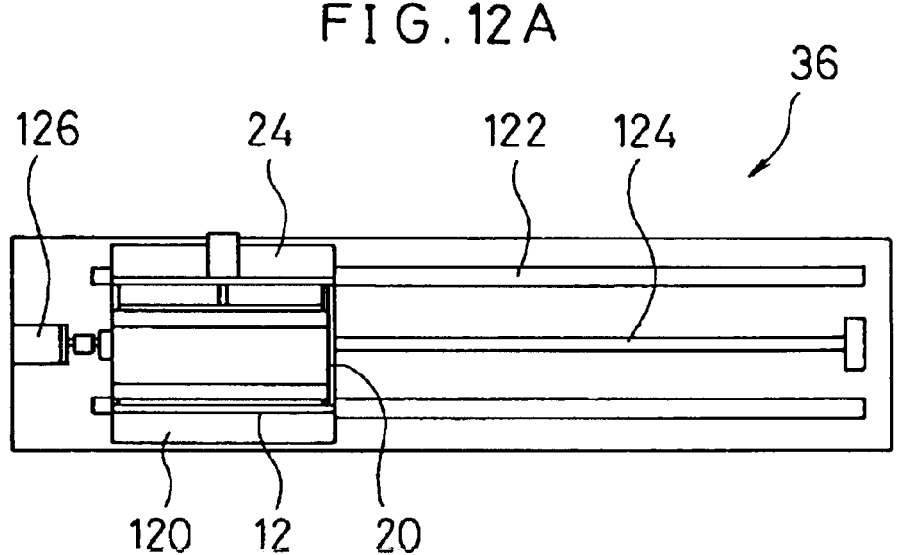
FIGS. 12A to 12C are views showing a transport unit 36.
Figure 12B:
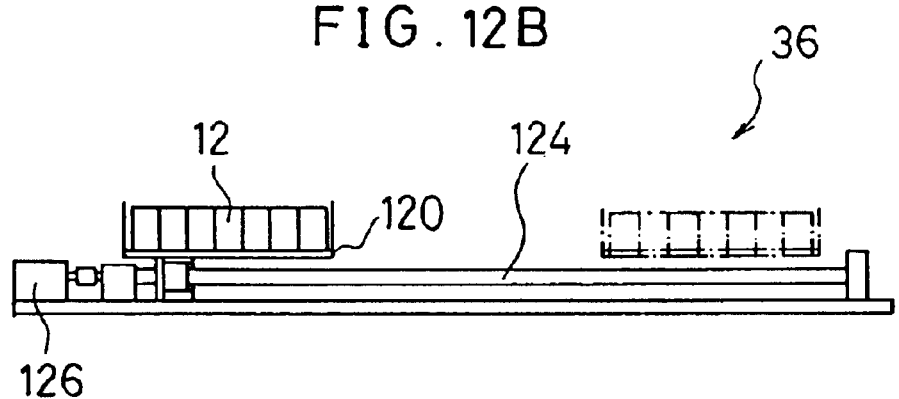
Figure 12C:
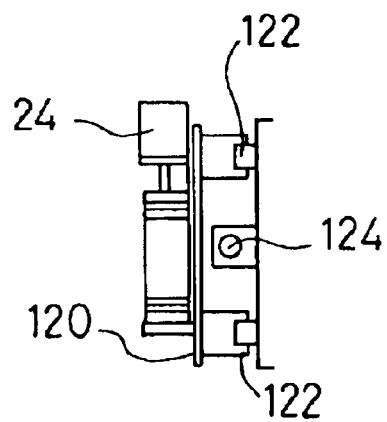

FIGS. 12A to 12C are views showing the transport unit 36. FIG. 12A is a plan view, FIG. 12B is a front view, and FIG. 12C is a right side view. The transport unit 36 moves and mounts the jig 20 between each of the steps of the sealing apparatus 10 by a transport table 120 provided with the pressurizing unit 24. A transport guide 122, a ball screw 124 and an NC motor 126 are provided to the transport table 120, and a linear motion bearing (not shown) is provided to the transport guide 122. Further, the movement data of the transport table 120 is set by the control unit 38, thereby the table is made to move between each of the steps of the sealing apparatus 10.

Figure 13:
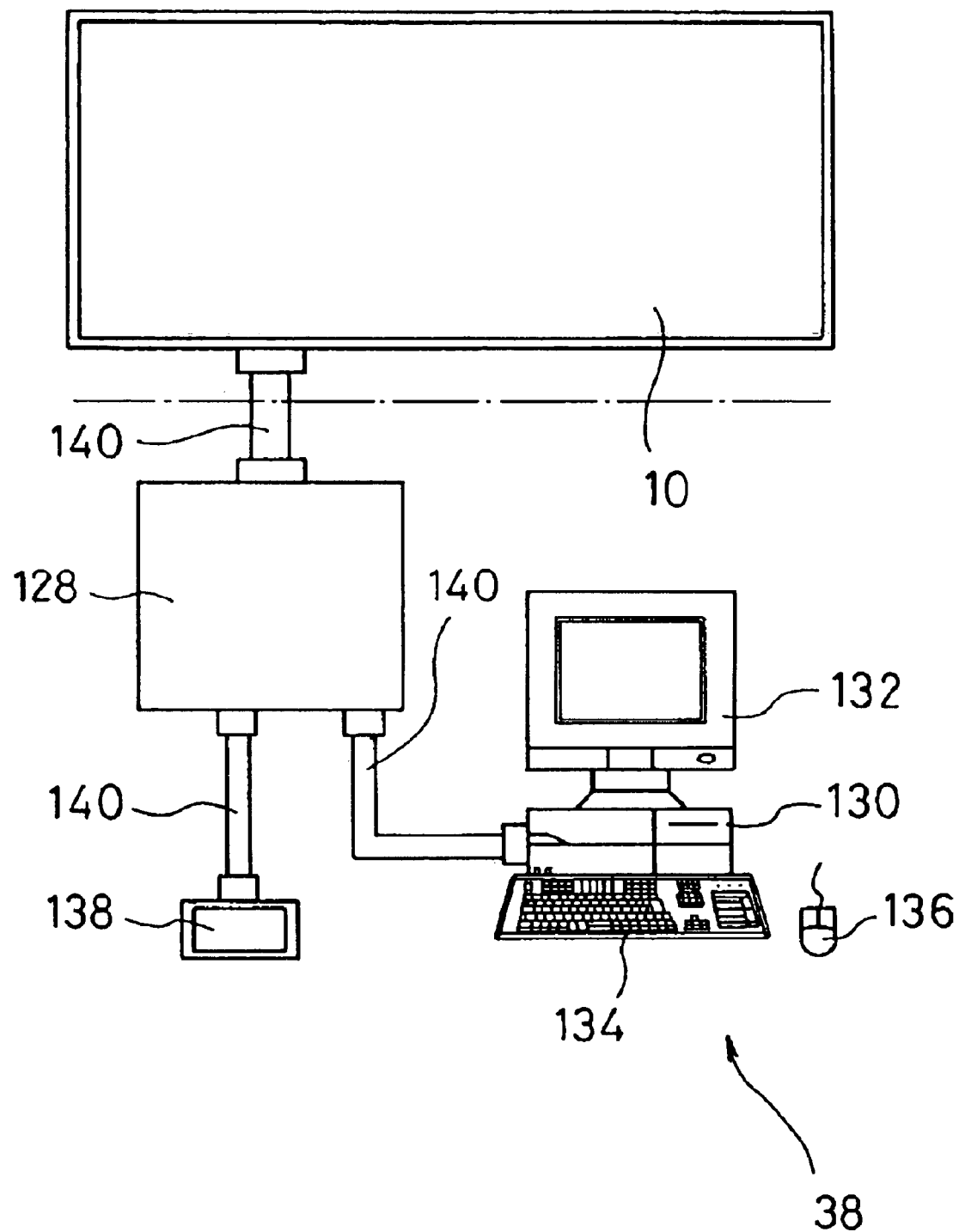
FIG. 13 is a view showing a control unit 38.

FIG. 13 is a view showing the control unit 38. A controller 128 that controls each mechanism unit of the sealing apparatus 10, a computer 130 that is located in the higher rank of the controller 128 and serves as a host in the sealing apparatus 10, a monitor 132, a keyboard 134 as an input device, a mouse 136 and a touch panel 138 as an operation panel of the sealing apparatus 10. The sealing apparatus 10, the controller 128, the computer 130 and the operation panel 138 are connected by an interface cable 140 to enable them to communicate with each other. Various kinds of data (recipe) generated in the computer 130 is transferred to the controller 128 when activating the sealing apparatus 10, an instruction is transferred to each structure section (the solenoid valve, the NC motor 126 and the like to move the air pressure actuator 50) by an operation program in the controller 128, and then the entire sealing apparatus 10 operates.

As described, the sealing apparatus 10 coats the ultraviolet ray curing sealing agent 16 on the filling port 14 of the liquid crystal display panel 12, and closes the filling port 14 by irradiating the ultraviolet ray to cure the agent.

Next, the operation of the sealing apparatus 10 will be described. Specifically, description will be made for the sealing method using the sealing apparatus 10. First in the sealing method, the liquid crystal panel 12 in the cassette 18 is moved to mount on the exclusive jig 20 of the sealing apparatus 10. Next, pressure is applied to the liquid crystal panel 12 to control the cell gap of the liquid crystal panel 12. Then, the wiping of exuded residual liquid crystal is executed, and a predetermined amount of the ultraviolet ray curing sealing agent 16 is coated on a predetermined position of the filling port 14 of the liquid crystal panel 12 in a lump. Thereafter, a predetermined amount of the ultraviolet ray is given to a predetermined position, and the ultraviolet ray curing sealing agent 16 is cured to seal (sealing) the filling port 14 of the liquid crystal panel 12.

Description will be made more specifically. First, the cassette 18 of the previous process is supplied to the loader cassette table 40 of the loader unit 22. When the activation of the sealing apparatus 10 is instructed by the control unit 38 (the sealing apparatus 10 is activated from the touch panel 64), the directivity of the supplied cassette 18 of the previous process is discriminated. If the direction is incorrect, the control unit 38 stops the sealing apparatus 10 to turn the alarm call and impels to rearrange the cassette in an accurate direction. The supplied cassette 18 of the previous process is fixed on the loader cassette table 40 by the air pressure actuator 44. Next, the supply handler 42 holds the liquid crystal panel 12 by vacuum chuck by every sheet or every strap, and moves it to mount into the jig 20 used in the sealing apparatus 10.

In the pressurizing unit 24, jig 20 is fixed by the air pressure actuator 52 in order to control the cell gap of the liquid crystal panel 12 supplied into the jig 20, and pressurizing processing is performed to the liquid crystal panel 12. At this point, the pressurizing actuator 50 varies the pressing force in the relation between the thrust and the time where a product type is set in advance, and controls the cell gap of the liquid crystal panel 12.

After completing the control of the cell gap of the liquid crystal panel 12 with the pressurizing unit 24, the exuded residual liquid crystal is wiped by the wiping unit 26. The wiping operation is executed to the liquid crystal panel 12 in the jig 20 from underneath by the wiping unit 26. The wiping roll 62 ascends by the ascending operation of the elevating rod 64 to make the wiping cloth 68 contact a surface of the liquid crystal panel 12 where the filling port 14 is formed.

Specifically, when the wiping roll 62 ascends, the wiping cloth 68 portion stretched between the guide rolls 58 and 60 is pushed up by the wiping roll 62 to the position where the cloth contacts the liquid crystal panel 12. At this point, the wiping cloth 68 is reeled out from the feeding roll 54 and pushed up. Note that the wiping cloth 68 reeled by the reeling roll 56 is prevented from being wound back at the time of reeling because the ratchet mechanism or the like is provided to the reeling roll 56.

The pressing force that the wiping roll 62 presses the wiping cloth 68 against the liquid crystal panel 12 is controlled by the pressure adjuster 70 not to become an overload to the liquid crystal panel 12 and to be a size having an optimal condition for wiping the ejected residual liquid crystal. Further, the ascending position of the wiping roll 62 is made to position slightly outside the filling port 14 at the extreme end. Next, when the ascending operation ends, the elevating rod 64 is moved toward the other end portion of the filling port 14 in the horizontal direction along the direction orthogonal to the moving direction of the liquid crystal panel 12 by the operation of the drive guiding mechanism 66, and the wiping roll 62 is moved to the same direction.

With this movement, the wiping cloth 68 contacts the filling port 14 sequentially from one end portion to the other end portion, and the ejected residual liquid crystal is wiped. Note that the movement in the horizontal direction is stopped at the position where the wiping roll 62 slightly exceeds the other end portion, and thus the wiping of the residual liquid crystal is completed. The wiping roll 62 is descended on completing the wiping. At this point, the wiping cloth 68 is in a sagged state where it is left at the ascended position for wiping. Then, when the reeling roll 56 is rotated, the sagged portion of the wiping cloth 68 is reeled by the reeling roll 56, and the portion that became dirty after wiping the residual liquid crystal is withdrawn.

Figure 14:
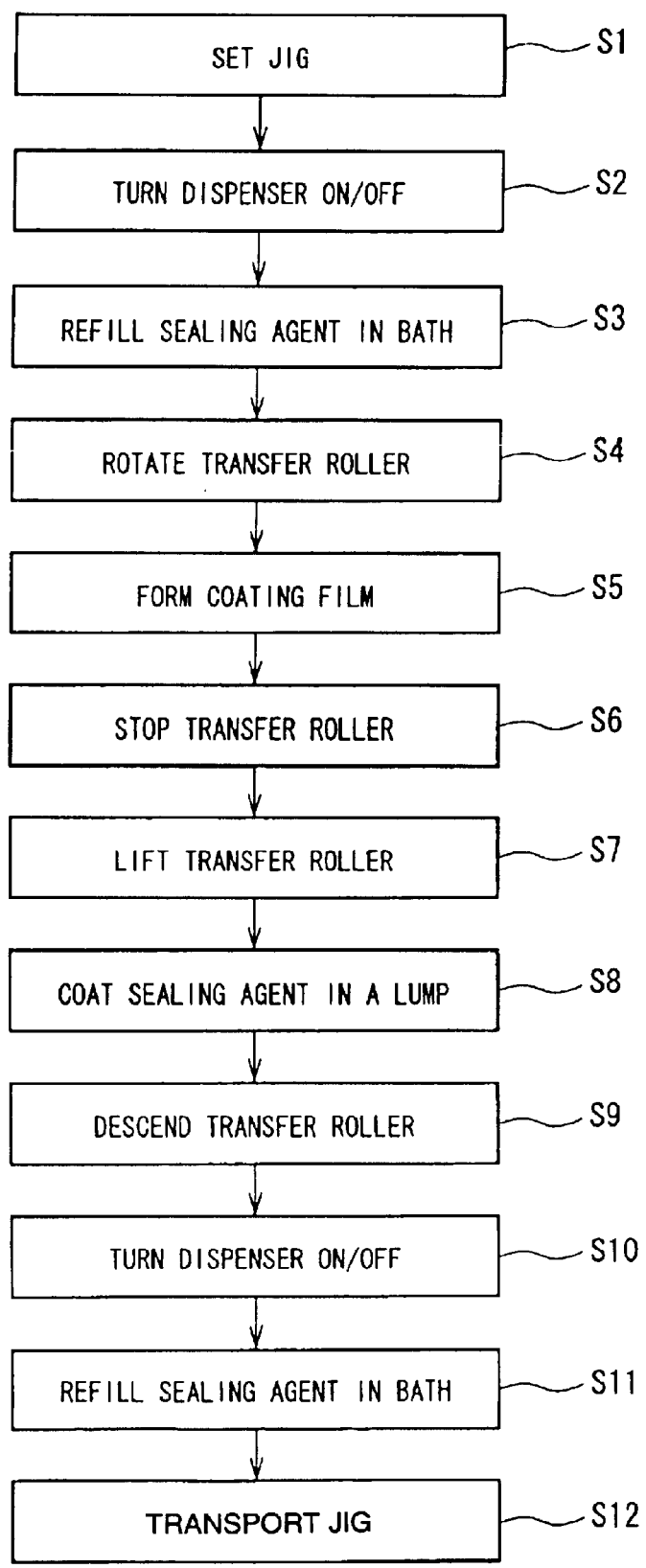
FIG. 14 is a flowchart showing the operation of the coating unit 28.
Figure 15A:
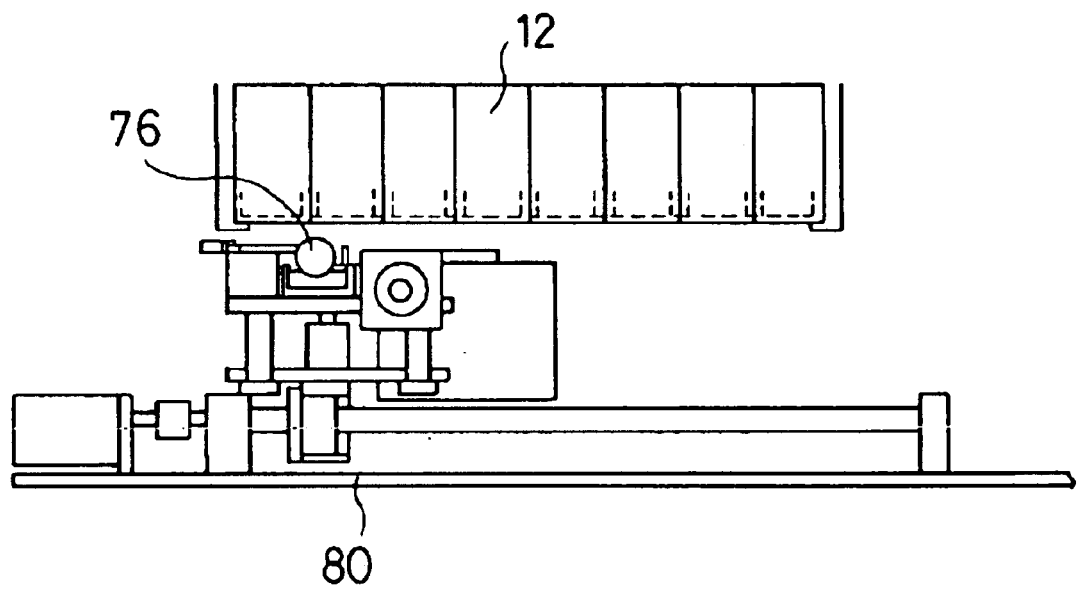
FIGS. 15A and 15B are views showing the operation of the coating unit 28.
Figure 15B:
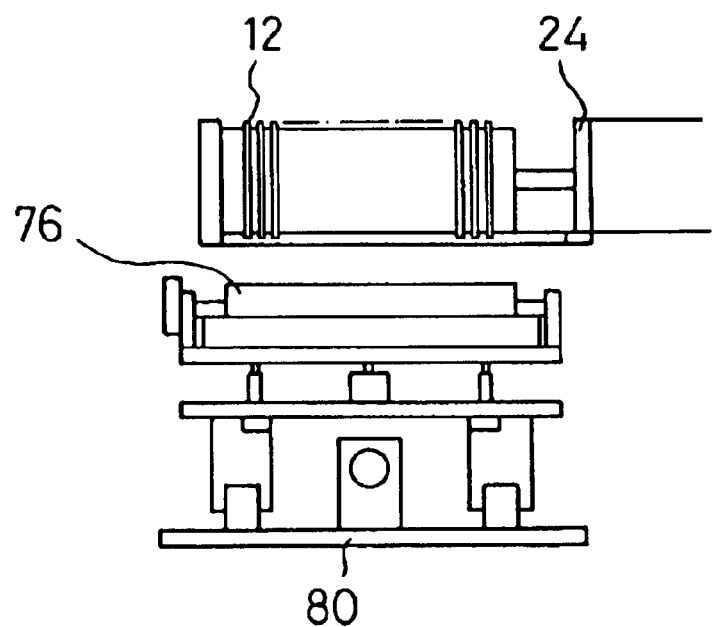

After completing the wiping of the residual liquid crystal, the coating unit 28 coats the ultraviolet ray curing sealing agent 16. Next, the coating method of the ultraviolet ray curing sealing agent 16 will be described. FIG. 14 is a flowchart showing the operation of the coating unit 28. FIGS. 15A and 15B are views showing the operation of the coating unit 28. FIG. 15A is a front view, and FIG. 15B is a right side view.

The jig 20 above the wiping unit 26 is transported directly above the coating unit 28 by the transport unit 36 (step S1). In the coating unit 28, by the operation of the dispense controller 74 (step S2), a predetermined amount of the ultraviolet ray curing sealing agent 16 is supplied from the sealing agent tank 72 to refill the sealing bath 78 (step S3).

Accordingly, the film of the ultraviolet ray curing sealing agent 16 with a predetermined thickness is formed in the sealing agent bath 78.

Figure 16A:
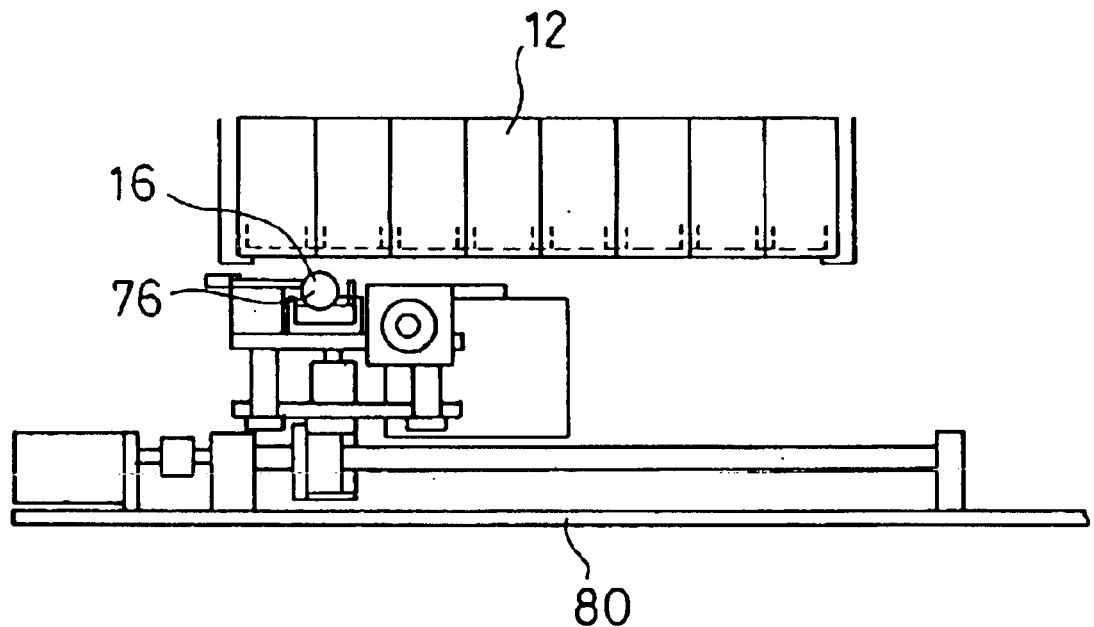
FIGS. 16A and 16B are views showing the operation of the coating unit 28, and are views showing the state after the state shown in FIGS. 15A and 15B.
Figure 16B:
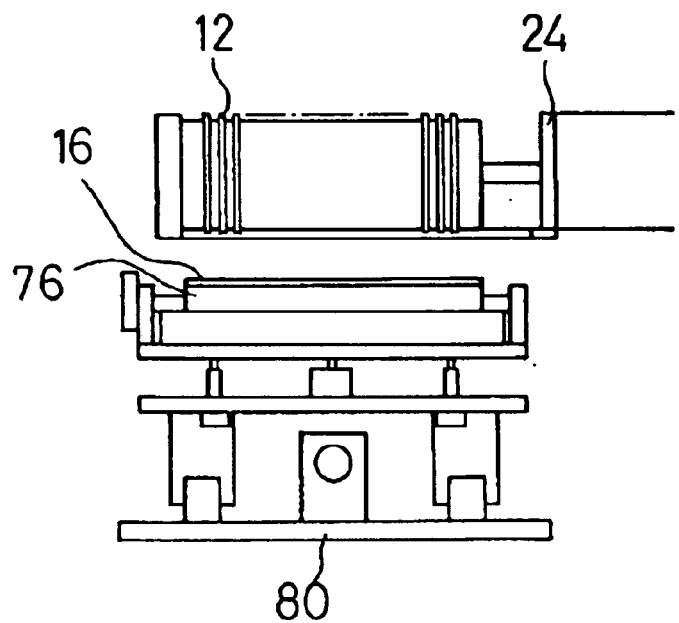

FIGS. 16A and 16B are views showing the operation of the coating unit 28, and are views showing the state after the state shown in FIGS. 15A and 15B. FIG. 16A is a front view, and FIG. 16B is a right side view. The transfer roller 76 is rotated by a predetermined rotating number (step S4) to contact the surface of the ultraviolet ray curing sealing agent 16, and the film of the ultraviolet ray curing sealing agent 16 is formed on the transfer roller 76 itself (step S5). At this point the squeegee 82 keeps the surface height of the ultraviolet ray curing sealing agent 16 attached to the transfer roller 76 at a constant level. Then, the transfer roller 76 is stopped (step S6), and is lifted up while keeping a certain gap to the filling port 14 of the liquid crystal panel 12 directly above the roller (step S7).

Figure 17A:
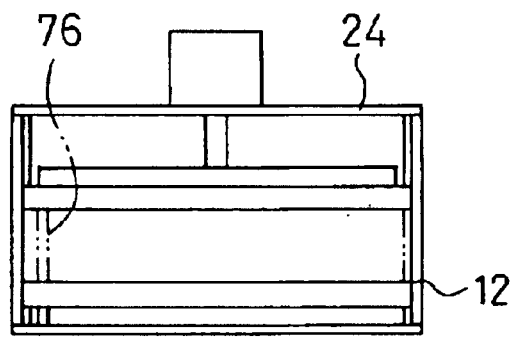
FIGS. 17A to 17C are views showing the operation of the coating unit 28, and are views showing the state after the state shown in FIGS. 16A and 16B.
Figure 17B:
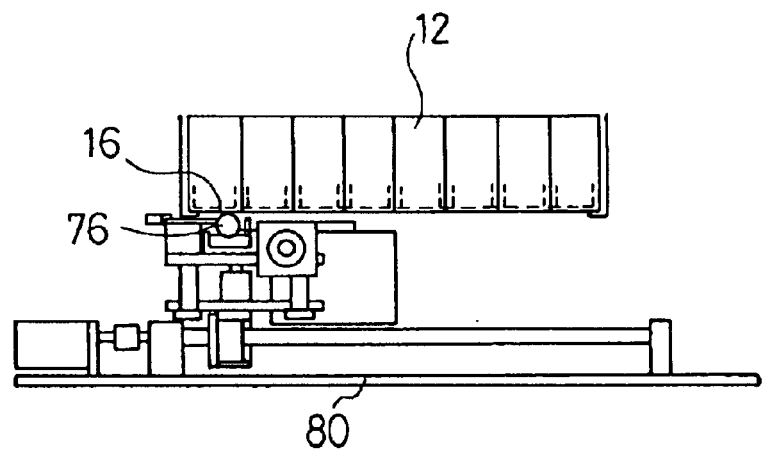
Figure 17C:
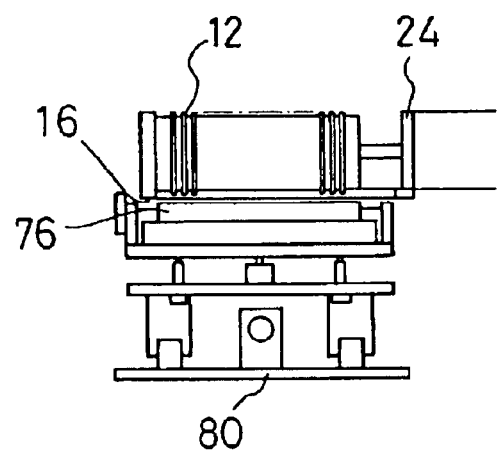

FIGS. 17A to 17C are views showing the operation of the coating unit 28, and are views showing the state after the state shown in FIGS. 16A and 16B. FIG. 17A is a plan view, FIG. 17B is a front view, and FIG. 17C is a right side view. Thereafter, the ultraviolet ray curing sealing agent 16 is coated on a predetermined position of the filling port 14 of the liquid crystal panel 12 by a predetermined amount utilizing the surface tension of the ultraviolet ray curing sealing agent 16 generated on the transfer roller 76 (step S8). At this point, since the liquid crystal panel 12 exists in the orthogonal direction to the longitudinal direction of the transfer roller 76, the coating of the ultraviolet ray curing sealing agent 16 completes with the same conditions to all the liquid crystal panels 12 that exist in the longitudinal direction of the transfer roller 76. In other words, a so-called full coating is realized. Furthermore, if the transfer rollers 76 (not shown) are made to exist for every array of the filling ports 14 of the liquid crystal panels 12 that are arranged in all the jigs 20, the coating of the ultraviolet ray curing sealing agent 16 can be realized in a lump. With this arrangement, the coating time of the ultraviolet ray curing sealing agent 16 is performed simultaneously, and thus the yield reduction due to the coating time difference is solved.

When the coating of the ultraviolet ray curing sealing agent 16 by the coating unit 28 completes to all the liquid crystal panels 12 in the jig 20, the coating state (the coating state of the filling port 14) is recognized by the CCD camera 108 installed. If the coating defective of the ultraviolet ray curing sealing agent 16 occurs, the sealing apparatus 10 is stopped to call the alarm of the occurrence of the coating defective.

After completing the ultraviolet ray curing sealing agent 16, the transfer roller 76 is descended (step S9), and by the operation of the dispense controller 74 (step S10), a predetermined amount of the ultraviolet ray curing sealing agent 16 is supplied from the sealing agent tank 72 to refill the sealing bath 78 (step 11).

Further, the pressurizing unit 24 performs decompression processing to control the penetration of the coated ultraviolet ray curing sealing agent 16. At this point, the pressurizing actuator 50 varies the decompression force in the relation between the thrust and the time where the product type is set in advance, and controls the penetration amount of the ultraviolet ray curing sealing agent 16 into the liquid crystal panel 12.

After completing the decompression processing to the liquid crystal panel 12 in the jig 20, the jig 20 above the coating unit 28 is transported directly above the UV irradiation unit 30 by the transport unit 36 (step S12). Then, the ultraviolet ray lamp 100 is turned on to cure the ultraviolet ray curing sealing agent 16, which is coated to fill the filling port 14, and the filling port 14 is closed (the curing operation of the ultraviolet ray curing sealing agent 16).

At this point, it is concluded that the coated ultraviolet ray curing sealing agent 16 is cured when the light quantity of the ultraviolet ray irradiated from the ultraviolet ray lamp 100 becomes a predetermined value. Accordingly, a value regarding an irradiation light quantity is set to the integrating light quantity meter for control 104 in advance, and the ultraviolet ray lamp 100 is turned off when the integrating light quantity of the ultraviolet ray lamp 100 becomes equal to a set value. Specifically, when the time, which is set such that the ultraviolet ray curing sealing agent 16 coated by the coating unit 28 sufficiently penetrates into the filling port 14, has passed, the operation of the integrating light quantity meter for control 104 is started simultaneously as the ultraviolet ray lamp 100 is turned on. The integrating operation of the integrating light quantity meter for control 104 makes ultraviolet ray lamp 100 turn on until the integrating light quantity reaches the set value, and the ultraviolet ray lamp 100 is turned off by an end signal output from the integrating light quantity meter for control 104 at the time when the integrating light quantity reaches the set value. The sealing operation ends with as the ultraviolet ray lamp 100 is turned off.

Further, the integrating light quantity meters for management 106 are also operated parallel with the integrating operation of the integrating light quantity meter for control 104. An optimal integrating light quantity value is set to the integrating light quantity meters for management 106 in advance, and the meter 106 compares the integrating light quantity received during the period of turning on and turning off of the ultraviolet ray lamp 100 with the set optimal integrating light quantity. If the integrating light quantity is short of the set light quantity, the alarm is called to notify of the shortage. When the curing operation of the ultraviolet ray curing sealing agent 16 by the UV irradiation unit 30 is completed to all the liquid crystal panels 12 in the jig 20, the installed CCD camera 108 recognizes the curing state (the sealing state of the filling port 14) of the ultraviolet ray curing sealing agent 16. If the curing defective of the ultraviolet ray curing sealing agent 16 occurs, the irradiation processing of the ultraviolet ray is performed again.

The jig 20 where the sealing of the filling port 14 of the liquid crystal panel 12 has completed by the ultraviolet ray irradiation is transported to the unloader unit 34 by the transport unit 36. In the unloader unit 34, the cassette 32 of the next process is supplied to the unloader cassette table 112, and its directivity is confirmed. If the direction is incorrect, the control unit 38 stops the sealing apparatus 10 to turn the alarm call and impels to rearrange the cassette in the accurate direction. The supplied cassette 32 of the next process is fixed on the unloader cassette table 112 by the air pressure actuator 116. Next, the storage handler 114 holds the liquid crystal panel 12 by vacuum chuck by every sheet or every strap, and stores it into the cassette 32. When all of the predetermined numbers of the panels are stored into the jig 20, the cassette 32 executes a call to impel ejection to the outside of the sealing apparatus 10.

The transport unit 36 operates engaged with the operation completion of each unit, and transports the jig 20 to the loader unit 22, the wiping unit 26, the coating unit 28, the UV irradiation unit 30 and the unloader unit 34 in this order. Furthermore, at the position directly above the UV irradiation unit 30, the transport unit 36 moves along the position (every array) of the filling port 14 of the liquid crystal panel 12 that exists in the jig 20 directly above the ultraviolet ray lamp based on the product type data previously registered.

According to such an sealing apparatus 10, the liquid crystal panels 12 are arranged in a well-order manner in the jig 20, the ultraviolet ray curing sealing agent 16 is transferred to the filling port 14 by the transfer roller 76 in the state where the film of the ultraviolet ray curing sealing agent 16 is formed with a uniform thickness, and thus the agent can be coated in a lump. Then, since the ultraviolet ray irradiation is performed to cure the sealing agent and seal the hole in a lump, the processing from the coating process to the curing process of the ultraviolet ray curing sealing agent 16 can be managed and each liquid crystal panel 12 can also be controlled. As a result, a uniform processing can be realized to each liquid crystal panel 12 that is processed in one batch. Particularly, in the coating operation of the ultraviolet ray curing sealing agent 16, a conventional problem of the expansion of the coating time difference when the number of the panels to be processed is large is solved. Accordingly, the sealing apparatus 10 with excellent quality and stability of the small size liquid crystal panel 12 can be obtained. Moreover, productivity improves and a product unit price greatly contributes to cost reduction because the full processing is executed.

Furthermore, since a liquid crystal panel gap in the jig 20 is controlled, the wiping of the residual liquid crystal is executed, and the coating state is recognized by the image processing to detect the defective, the positional accuracy and the coating amount of the ultraviolet ray curing sealing agent 16 coated on the small size liquid crystal panel 12 can be stabilized.

In addition, an irradiation area is masked by using the mask 102 and the ultraviolet ray is irradiated only on the coated area for curing, and thus the masked portion can be varied corresponding to the product type. Therefore, the positional accuracy and the amount of the ultraviolet ray irradiation to the small size liquid crystal panel 12 can be stabilized.

Still further, the sealing apparatus can easily cope with various product types because each section of the sealing apparatus 10 has flexibility.

Note that the embodiment described herein is one preferred embodiment of the present invention. The present invention is not limited to this, but it is a matter of course that variations can be made within the scope of the invention. For example, the sealing apparatus comprises the pressurizing unit 24, the wiping unit 26, the light quantity meters 104 and 106, the mask 102 and the like in this embodiment, but they are not integrant.

What is claimed is:

1. A sealing method of a liquid crystal display panel, comprising the steps of:
   arranging a plurality of liquid crystal display panels having filling ports to fill liquid crystal;
   transferring an ultraviolet ray curing sealing agent in a wet state to each of said filling ports upon an outer surface of a transfer roller in a lump; and
   irradiating an ultraviolet ray to said ultraviolet ray curing sealing agent.

2. The sealing method of the liquid crystal display panel according to claim 1, further comprising the step of pressing opposing substrates of said liquid crystal display panel with each other.

3. The sealing method of the liquid crystal display panel according to claim 2, further comprising the step of wiping residual liquid crystal of said liquid crystal display panel in a lump.

4. The sealing method of the liquid crystal display panel according to claim 3, wherein irradiating the ultraviolet ray to said ultraviolet ray curing sealing agent comprises the step of curing said ultraviolet ray curing sealing agent by irradiating the ultraviolet ray to said ultraviolet ray curing sealing agent through a mask in a lump.

5. The sealing method of the liquid crystal display panel according to claim 2, wherein irradiating the ultraviolet ray to said ultraviolet ray curing sealing agent comprises the step of curing said ultraviolet ray curing sealing agent by irradiating the ultraviolet ray to said ultraviolet ray curing sealing agent through a mask in a lump.

6. The sealing method of the liquid crystal display panel according to claim 1, further comprising the step of wiping residual liquid crystal of said liquid crystal display panel in a lump.

7. The sealing method of the liquid crystal display panel according to claim 6, wherein irradiating the ultraviolet ray to said ultraviolet ray curing sealing agent comprises the step of curing said ultraviolet ray curing sealing agent by irradiating the ultraviolet ray to said ultraviolet ray curing sealing agent through a mask in a lump.

8. The sealing method of the liquid crystal display panel according to claim 1, wherein irradiating the ultraviolet ray to said ultraviolet ray curing sealing agent comprises the step of curing said ultraviolet ray curing sealing agent by irradiating the ultraviolet ray to said ultraviolet ray curing sealing agent through a mask in a lump.

9. The sealing method of the liquid crystal display panel according to claim 1, further comprising the step of confirming a coating state of said ultraviolet ray curing sealing agent to said filling ports and an sealing state by said ultraviolet ray irradiation.

10. The sealing method of the liquid crystal display panel according to claim 1, further comprising the step of removing portions of the ultraviolet ray curing sealing agent disposed on the outer surface of the transfer roller to maintain a uniform thickness of the ultraviolet ray curing sealing agent.

11. The sealing method of the liquid crystal display panel according to claim 1, wherein the step of transferring an ultraviolet ray curing sealing agent is performed in a nitrogen atmosphere.

12. A sealing apparatus for a liquid crystal display panel, comprising:
    a cassette in which a plurality of liquid crystal display panels having filling ports to fill liquid crystal; and
    a transfer roller which transfers a an ultraviolet ray curing sealing agent in a wet state upon its outer surface to each of said filling ports in a lump.

13. The sealing apparatus for the liquid crystal display panel according to claim 12, further comprising a pressurizing unit which presses opposing substrates of said liquid crystal display panel with each other.

14. The sealing apparatus for the liquid crystal display panel according to claim 13, further comprising a wiping unit which wipes residual liquid crystal of said liquid crystal display panel in a lump.

15. The sealing apparatus for the liquid crystal display panel according to claim 14, further comprising:
    a mask with an opening which matches to said filling port; and
    a ultraviolet ray irradiation device which irradiates an ultraviolet ray to said ultraviolet ray curing sealing agent through said mask.

16. The sealing apparatus for the liquid crystal display panel according to claim 13, further comprising:

a mask with an opening which matches to said filling port; and a ultraviolet ray irradiation device which irradiates an ultraviolet ray to said ultraviolet ray curing sealing agent through said mask.

17. The sealing apparatus for the liquid crystal display panel according to claim 12, further comprising a wiping unit which wipes residual liquid crystal of said liquid crystal display panel in a lump.

18. The sealing apparatus for the liquid crystal display panel according to claim 17, further comprising:

a mask with an opening which matches to said filling port; and a ultraviolet ray irradiation device which irradiates an ultraviolet ray to said ultraviolet ray curing sealing agent through said mask.

19. The sealing apparatus for the liquid crystal display panel according to claim 12, further comprising:

a mask with an opening which matches to said filling port; and a ultraviolet ray irradiation device which irradiates an ultraviolet ray to said ultraviolet ray curing sealing agent through said mask.

20. The sealing apparatus for the liquid crystal display panel according to claim 12, further comprising a sensor capable of confirming a coating state of said ultraviolet ray curing sealing agent to said filling ports and an sealing state by said ultraviolet ray irradiation.

21. The sealing apparatus for the liquid crystal display panel according to claim 12, further comprising a squeegee arranged adjacent to the transfer roller to form a gap therebetween, wherein the squeegee removes portions of the ultraviolet ray curing sealing agent disposed on the outer surface of the transfer roller to maintain a uniform thickness of the ultraviolet ray curing sealing agent.

22. The sealing apparatus for the liquid crystal display panel according to claim 12, wherein the transfer roller is arranged in a nitrogen atmosphere.

23. A sealing method of a liquid crystal display panel, comprising the steps of:

arranging a plurality of liquid crystal display panels having filling ports to fill liquid crystal;

transferring an ultraviolet ray curing sealing agent in a wet state to all of said filling ports simultaneously upon an outer surface of a transfer roller that supports a predetermined amount of said ultraviolet ray curing sealing agent;

irradiating an ultraviolet ray to said ultraviolet ray curing sealing agent.

24. The sealing method of the liquid crystal display panel according to claim 23, further comprising the step of removing portions of the ultraviolet ray caring sealing agent disposed on the outer surface of the transfer roller to maintain a uniform thickness of the ultraviolet ray curing sealing agent.

25. The sealing method of the liquid crystal display panel according to claim 23, wherein the step of transferring an ultraviolet ray curing sealing agent is performed in a nitrogen atmosphere.

26. A sealing apparatus for a liquid crystal display panel, comprising:

a cassette in which a plurality of liquid crystal display panels having filling ports to fill liquid crystal; and a transfer roller disposed so as to be able to transfer a ultraviolet ray curing sealing agent in a wet state upon its outer surface to all of said filling ports simultaneously.

27. The sealing apparatus for the liquid crystal display panel according to claim 26, further comprising a squeegee arranged adjacent to the transfer roller to form a gap therebetween, wherein the squeegee removes portions of the ultraviolet ray curing sealing agent disposed on the outer surface of the transfer roller to maintain a uniform thickness of the ultraviolet ray curing sealing agent.

28. The sealing apparatus for the liquid crystal display panel according to claim 26, wherein the transfer roller is arranged in a nitrogen atmosphere.

* * * * *